Oct. 10, 1961  J. R. OISHEI  3,003,171
WINDSHIELD CLEANING SYSTEM
Filed Aug. 11, 1959  2 Sheets-Sheet 1

INVENTOR.
JOHN R. OISHEI
BY
Bean Brooks Buckley Bean
ATTORNEYS

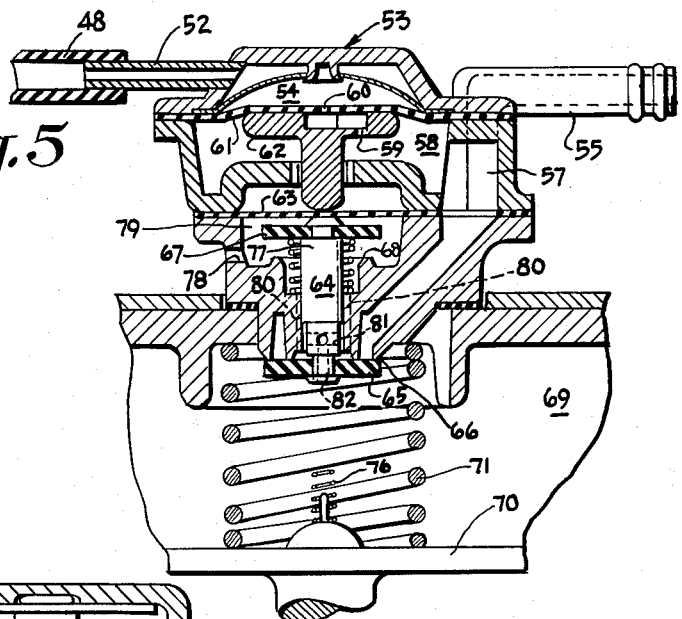

United States Patent Office 3,003,171
Patented Oct. 10, 1961

3,003,171
WINDSHIELD CLEANING SYSTEM
John R. Oishei, Buffalo, N.Y., assignor to Trico
Products Corporation, Buffalo, N.Y.
Filed Aug. 11, 1959, Ser. No. 833,101
10 Claims. (Cl. 15—250.02)

The present invention relates to a vehicle windshield cleaning system and more particularly to an improved control arrangement therefor.

In the past, two basic types of manually operated windshield washers capable of automatically providing joint operation of a windshield washer pump and a wiper motor were available. In one of these types, it was necessary for the vehicle operator to positively hold the washer actuator with one hand for the entire period that solvent projection on the vehicle windshield was desired. This mode of operation had serious drawbacks. More specifically, considering the fact that approximately a five-second projection of solvent onto the windshield is required for adequate washing, the vehicle operator was required to maintain his hand removed from the vehicle steering wheel for a distance of approximately $\frac{1}{10}$ of a mile when the vehicle was travelling at a speed of 60 m.p.h. This removal of a hand from the steering wheel was further complicated by the fact that the vehicle operator was required to maintain his hand on the dashboard of the vehicle, and thereby assume an unnatural sitting position all the while that he was required to drive with one hand. Furthermore, if for some reason the vehicle operator, in utilizing the above-described system, was required to remove his hand from the washer control and return it to the steering wheel after only a relatively short interval of solvent projection, the supplying of an inadequate amount of solvent to the windshield resulted in merely smearing the existing dirt already on the windshield, thereby reducing visibility more than it was already reduced before the washer was placed in operation. A further shortcoming of the above-described type of system which required the vehicle operator to maintain his hand on the washer control all the time that solvent projection was required, was that the vehicle operator would often maintain his hand on the control for an excessively long time, thereby exhausting his solvent supply after relatively few windshield cleaning operations. A second type of windshield washer system, which was not subject to any of the foregoing shortcomings, required that a button be only momentarily depressed for the purpose of providing joint washer and wiper operation, and thereafter a predetermined measured supply of solvent was supplied to the windshield and washer operation was automatically terminated prior to the cessation of wiper operation to provide the vehicle operator with a clear, dry, windshield after the termination of the cleaning operation. The advantage of the second system was that the vehicle operator did not either have to remove his hands from the steering wheel for a prolonged period nor did he have to consciously determine when an adequate supply of solvent was projected onto the windshield. In the second type of system, a combined control was utilized for selectively providing either sole wiper operation, or joint wiper-washer operation by the pressing of a button. The present invention is concerned with a control which is an improvement over the controls utilized in both the above-mentioned first and second systems.

It is therefore one object of the present invention to provide a combined windshield wiper-washer control which requires the vehicle operator to perform only a momentary positive rotary manual manipulation to place either the wiper system or the washer system in operation, thereby obviating the possibility of inadvertent actuation of the washer control when the wiper control is actuated, and also requiring that the operator remove his hand from the steering wheel only momentarily.

It is another object of the present invention to provide a combined dual rotary wiper-washer control in which both the wiper and the washer control knobs are adjacent to each other and coaxially positioned about a common axis, thereby providing an arrangement which conditions the vehicle operator to reach only to one point on the vehicle dashboard for instantly actuating either the wiper or the washer systems, and further conditions the vehicle operator to perform only a unidirectional rotary manual manipulation when either washer or wiper operation is desired. The foregoing mode of operation requiring only a unidirectional rotary manipulation at substantially the same location for placing either the wiper or washer in operation, requires that the vehicle operator give very little thought to the initiation of a windshield cleaning operation, whether it be sole initiation of the wiper or joint actuation of the washer and wiper, thereby inherently resulting in a minimum of distraction of the driver from his primary driving duties.

A further object of the present invention is to provide a combined dual rotary windshield wiper-washer control which, in addition to requiring a positive rotary manipulation on the part of the operator to place either the washer system or the wiper system in operation, also permits the wiper system to remain in operation at the termination of washer operation until such time that the vehicle operator turns the wiper system control off manually, thereby permitting the wiper system to provide a dry-wipe cycle of variable duration in accordance with the desire of the vehicle operator. Other objects and attendant advantages of the present invention will readily be perceived hereafter.

The double rotary washer-wiper switch of the present invention is adapted to actuate the windshield washer and wiper systems of an automotive vehicle. More specifically, the washer control and wiper control are adapted to be manually rotated about a common axis. When a windshield washing operation is desired, the manual rotation of the washer control will actuate a valve which automatically places the washer in operation and substantially simultaneously through a coupling arrangement, turns the wiper control switch to an on position, thereby providing joint washer and wiper operation. Thereafter, when the washer control is released, it returns to a de-actuated position. The washer is of the type which projects a measured quantity of solvent onto the windshield for spreading by the wipers. After this measured quantity is exhausted, the wiper control switch remains in an on position until such time as it is manually turned off, thereby permitting the length of the dry wipe cycle to be controlled by the vehicle operator. When sole operation of the windshield wipers are required without accompanying operation of the windshield washer, the above-mentioned wiper control switch is actuated by a rotary manual manipulation, and when it is desired to terminate wiper operation, a manual rotary manipulation of the wiper switch in an opposite direction is required. It is to be especially noted that the linkage between the washer control switch and the wiper control switch is single acting in the sense that the actuation of the washer control switch will cause a corresponding actuation of the wiper control switch, whereas the actuation of the wiper switch will in no way affect the washer switch. The present invention will be more fully understood when the following portions of the specification are read in conjunction with the accompanying drawings wherein:

FIG. 5 is a fragmentary view, partially in cross-section, of the washer which is adapted to be used with the control of FIG. 2;

FIG. 6 is a fragmentary view of a modified type of washer which may be used; and FIG. 7 is a fragmentary view, partially in cross-section, of the manner in which the control switch of FIG. 2 must be modified in order to operate with the washer disclosed in FIG. 6.

Figure 1:
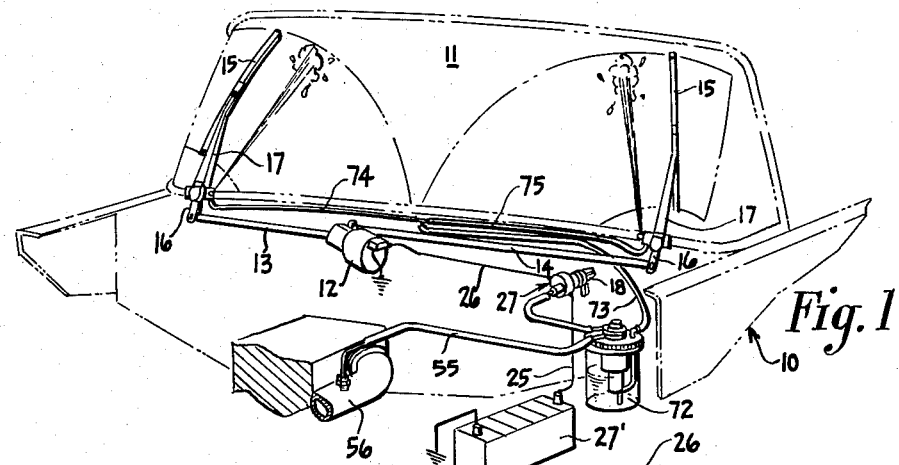
FIG. 1 is a fragmentary perspective view of an automotive vehicle mounting the improved control of the present invention.

In FIG. 1, an automotive vehicle 10 is shown having a windshield 11 mounted thereon. A wiper motor 12 is suitably mounted on the vehicle firewall and is adapted to produce rotary motion for driving links 13 and 14 which are coupled to windshield wiper blades 15 through rocker arms 16 mounted on rockshafts (not shown) which, in turn, mount wiper arms 17. As is well understood in the art, whenever wiper motor 12 is placed in operation, wiper blades 15 will oscillate back and forth across windshield 11.

When it is desired to effect sole windshield wiper motor operation, as is required during rainy weather, it is merely necessary to manipulate knob 18 in a clockwise direction (when viewed from the left of FIG. 2) to thereby cause switch shaft 19 to rotate in a clockwise direction also. This action is obtained because knob 18 (FIG. 3) is secured against rotation on shaft 19 by sleeve 20 having set screw 21 fitting within irregular protuberance 22 of the sleeve. It will readily be seen that irregular protuberance 22 prevents relative rotation between sleeve 20 and knob 18 and that set screw 21, when tightened, seats on flat 23 of shaft 19 to thereby prevent rotation between sleeve 20 and shaft 19. The foregoing described structure thus prevents relative rotation between knob 18 and shaft 19 when the parts are assembled. As noted above, the clockwise rotation of knob 18 will, through shaft 19, cause an armature (not shown) within switch body 24 to close a circuit between the terminals contacted by conductors 25 and 26 to thereby complete a circuit from battery 27' to motor 12 through the above-mentioned conductors and switch 27. When it is desired to terminate wiper motor operation, it is merely necessary to turn knob 18 in a counterclockwise direction to disrupt electrical contact between conductors 25 and 26.

It is to be noted that a threaded fitting 28 extends from body portion 24 of switch 27. This fitting is adapted to fit through a suitable aperture (not numbered) in dashboard 29. Thereafter, washer stop 30 and threaded member 31 are mounted thereon and the assembly is secured on the dashboard by nut 32. Washer stop 30 is keyed in position on fitting 28 by a suitable arrangement (not shown). The washer actuating knob 33 is rotatably mounted on flange 34 extending from the end of knob 18 and is retained thereon by washer 35 which is, in turn, retained on flange 34 by the portion thereof which is spunover as at 36. In placing the assembly of wiper knob 18 and washer knob 33 on threads 37 of portion 31, it is merely necessary to place internal threads 38 inside of washer knob 33 in engagement with threads 37 and rotate the knob assembly. A point will be reached wherein the rearwardly extending shoulder 39 of knob 33 will ride on the internal surface 40 of washer stop 30 (which is made of spring steel), until such time as it clears said surface 40 whereupon leg 41 which forms a part of surface 40 will spring back to the position shown in FIG. 4 to thereby abut shoulder 39 of washer knob 33 whenever the latter is in its full counterclockwise position shown in FIG. 4 to thereby prevent its separation from the remainder of the switch assembly.

Figures 2, 3:
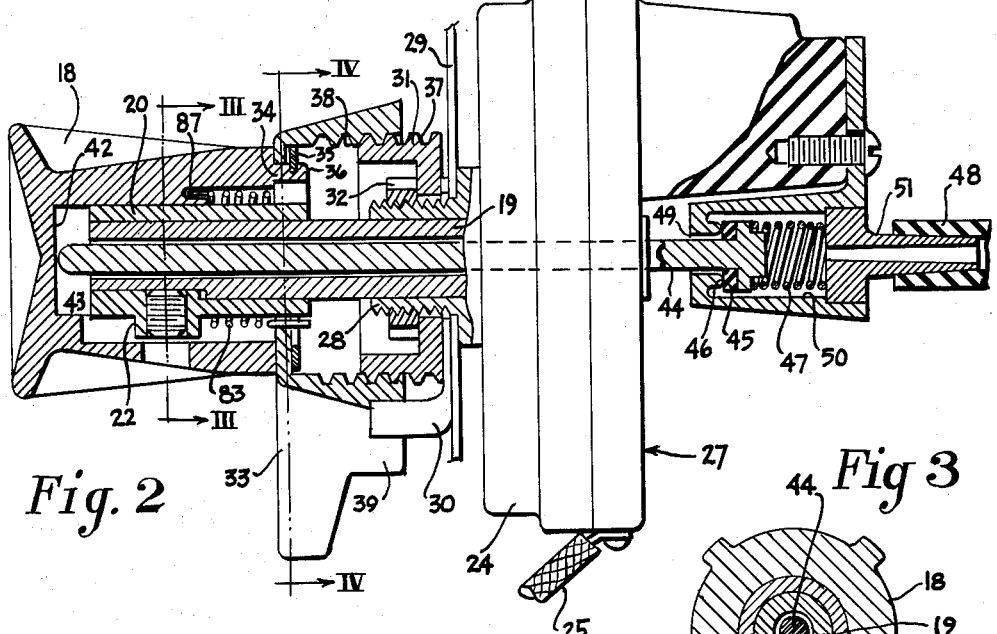
FIG. 2 is an elevational view, partially in cross-section, of the improved control of the present invention on an enlarged scale.
FIG. 3 is a view taken along line III—III of FIG. 2.

When it is desired to initiate a combined washer-wiper operation, it is merely necessary to rotate wing knob 33 in a clockwise direction as viewed from the left in FIG. 2. This will cause washer knob 33 to move to the right relative to the switch housing 24 because of the coarse threads (preferably triple threads) 37—38. The movement of knob 33 to the right will be accompanied by a corresponding movement of wiper knob 18 to the right which will cause internal surface 42 of knob 18 to abut tip 43 of stem 44. Continued movement of stem 44 to the right in response to the rotation of knob 33 will cause valve 45 at the end of stem 44 to become unseated from valve seat 46. The foregoing unseating of valve 45 against the bias of spring 47 will permit atmosphere to communicate with conduit 48 through aperture 49, chamber 50, and nipple 51. Conduit 48 has the other end thereof coupled to nipple 52 extending from washer 53. Washer 53 is of the general type disclosed in Patent No. 2,877,486, and operates generally on the same basic principle to project a measured quantity of solvent onto the windshield upon the manipulation of knob 33 in the above-described manner.

More specifically, when conduit 48 is vented to the atmosphere in the above-described manner, chamber 54 of washer 53 is also vented. Chamber 54 was previously under vacuum inasmuch as conduit 55 which is coupled to the engine intake manifold 56 is in communication therewith through valve conduit 57, valve chamber 58, vent 59, and diaphragm vent 60. It can readily be seen that when chamber 54 is thus vented, diaphragm 61 will be pulled downwardly under the influence of vacuum in chamber 58, thereby pushing member 62 downwardly with it. The bottom of member 62 abuts diaphragm 63 which, in turn, has the other side in abutting relationship with valve assembly 64. The downward movement of member 62 causes a downward movement of diaphragm 63 which, in turn, causes valve assembly 64 to move downwardly to such a position wherein valve 65 becomes unseated from seat 66 and valve 67 becomes seated on seat 68. The foregoing action will permit the engine intake manifold vacuum in conduit 55 to communicate with chamber 69 of washer 53 to thereby pull piston 70 upwardly against the bias of spring 71. Piston 70, in turn, is coupled to a washer pump piston which takes in a charge of solvent from a reservoir 72 when piston 70 is moved upwardly and the pump piston discharges this solvent through conduits 73, 74, and 75 onto windshield 11 after piston 70 reaches the top of its travel. In the foregoing respect it is to be noted that the evacuation of chamber 69 of motor 53 causes piston 70 to move upwardly. In its uppermost position spring 76 engages the bottom of valve 65 and moves it upwardly to the position shown in FIG. 5. This will cause valve 65 to be seated on seat 66 and thereby terminate the communication of vacuum between the engine intake manifold and chamber 69. Furthermore, when valve 65 is seated, valve 67, mounted on the other end of their common stem 77, is unseated, thereby permitting atmosphere to communicate with chamber 69 through aperture 78, valve chamber 79, the flutes 80 surrounding stem 77, and conduits 81 and 82 within valve stem 77. The exposing of chamber 69 to the atmosphere in the foregoing manner permits spring 71 to expand, thereby returning piston 70 to its lowermost position and causing the pump piston (not shown) to expel its charge of solvent. A fuller description of the mode of operation of the washer pump can be realized from Patent No. 2,877,486 mentioned above.

Figure 4:
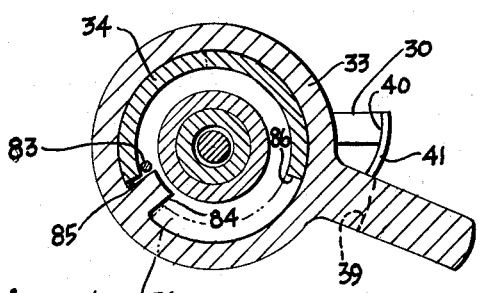
FIG. 4 is a view taken along line IV—IV of FIG. 2.

After the actuation of washer 53 in the above-described manner, the release of knob 33 will permit spring 83 in the combined knobs to uncoil, thereby returning knob 33 to its position shown in FIG. 4. More specifically, when the clockwise rotation (FIG. 4) of knob 33, which is required to place the washer in operation, is terminated and knob 33 is released, spring 83 will uncoil to move knob 33 back to its position in abutment with element 41 of member 30.

The clockwise rotation of washer knob 33 is accompanied by a corresponding clockwise rotation of wiper knob 18 to place wiper motor 12 in operation conjointly with the washer. More specifically, when washer knob 33 is rotated in a clockwise manner, internal protuberance 84 therein will engage shoulder 85 of flange 34 of wiper knob 18, thereby causing the latter to rotate in unison with knob 33. Suitable detents (not shown) are provided within the switch body 24 to maintain the contacts closed and knob 18 in its full clockwise motor-on position after the release of knob 33. When knob 33 is released, shoulder 86 (FIG. 4) of flange 34 will occupy the dotted line position shown in FIG. 4, thereby permitting washer knob 33 to return to its position in FIG. 4 under the uncoiling influence of spring 83 without returning switch 18 to its off position. In the foregoing respect it is to be noted that end 87 of spring 83 is anchored in knob 18 as shown in FIG. 2.

After termination of the projection of the measured charge of solvent, the wiper motor 12 will continue in operation because wiper knob 18 remains in an on position. The vehicle operator may permit the wiper motor to continue as long as he desires and when the windshield is wiped to a sufficiently dry state, knob 18 is manipulated in a counterclockwise direction to turn the motor off. This counterclockwise rotation of knob 18 is the same action which is utilized to turn motor 12 off at the termination of sole wiper operation. It will readily be appreciated that when knob 18 is turned in a counterclockwise direction to turn wiper motor 12 off, flange 34 will return to the solid line position shown in FIG. 4 from the dotted line position shown therein.

A modified embodiment of the present invention is shown in FIGS. 6 and 7. In this embodiment the valve 45 has been replaced with an electrical switch 90 mounted on the end of stem 44. The electrical switch includes an armature 91 which is adapted to complete a circuit across terminals 92 and 93 which are connected to conductors 94 and 95, respectively. When the switch mechanism of FIG. 2 is actuated in the above-described manner, a circuit is completed between conductors 94 and 95 to thereby energize the solenoid coil 96 of the washer shown in FIG. 6. This washer may be identical in construction to that disclosed in Patent No. 2,877,485. Briefly, the energization of solenoid coil 96 causes valve stem 97 to move downwardly, thereby admitting vacuum into chamber 98 of pump 99 from conduit 100 which is in communication with the engine intake manifold because valve 101 is unseated. The evacuation of chamber 99 will result in causing a pump connected to piston 102 to effect an intake stroke from a solvent reservoir. After piston 102 has risen to its uppermost position, spring 103 mounted on the top thereof will engage the bottom side of valve 101 and cause valve 104, mounted on the upper end of common stem 97 to be raised to permit atmosphere to communicate with chamber 98 through aperture 105, space 106, and apertures 107 in valve 101. The communication of chamber 98 to the atmosphere will permit spring 108 which biases piston 102 to expand, thereby causing the pump connected to piston 102 to effect a discharge stroke whereby solvent is discharged onto the windshield. A full explanation of the washer shown in FIG. 6 is given in the above-described Patent No. 2,877,485.

The modification of FIGS. 6 and 7 utilizes a control which is identical in all respects to that disclosed in FIGS. 2, 3, and 4 except for the above-described electrical contact which is utilized instead of the pneumatic valve.

While preferred embodiments of the present invention have been disclosed, it is to be understood that the present invention is not to be limited thereto but may be otherwise embodied within the scope of the following claims.

What is claimed is:

1. A combined windshield wiper-washer control comprising a first rotatable member for initiating sole wiper motor operation, a second member rotatable in the same direction as said first member, said second member including means for engaging said first member to thereby cause said first member to actuate said wiper motor when said second member is rotated, and means operable in response to the rotation of said second member for initiating operation of said washer whereby actuation of said second member results in joint wiper-washer operation.

2. A combined windshield wiper-washer control comprising a first rotatable member for initiating sole wiper motor operation, a second member positioned coaxially with said first member and rotatable in the same direction as said first member, said second member including means for engaging said first member to thereby cause said first member to actuate said wiper motor when said second member is rotated, and means operable in response to the rotation of said second member for initiating operation of said washer whereby actuation of said second member results in joint wiper-washer operation.

3. A combined windshield wiper-washer control comprising a first rotatable member for initiating sole wiper motor operation, a second rotatable member coaxially mounted relative to said first rotatable member, said second member including means for engaging said first member to thereby cause said first member to actuate said wiper motor when said second member is rotated, and means operable in response to the rotation of said second member for initiating operation of said washer whereby actuation of said second member results in joint wiper-washer operation.

4. A combined windshield wiper-washer control comprising a first rotatable member for initiating and terminating sole wiper motor operation, a second rotatable member, said second member including means for causing said first rotatable member to actuate said wiper when said second member is rotated, means operable in response to the rotation of said second member for initiating operation of said washer whereby actuation of said second member results in joint wiper-washer operation, and means for causing said second member to return to a deactuated position after release thereof.

5. A combined windshield wiper-washer control comprising a first rotatable member for initiating and terminating sole wiper motor operation, a second rotatable member, said second member including means for engaging said first member to thereby cause said first member to initiate wiper motor operation in response to the manipulation of said second member, means operable in response to the rotation of said second member for initiating operation of said washer whereby actuation of said second member results in joint wiper-washer operation, and means for causing said second member to return to a deactuated position after release thereof while permitting said first rotatable member to remain in a wiper actuating position whereby said wiper remains in operation until said first rotatable member is manipulated.

6. A combined windshield wiper-washer control comprising a first rotatable member for initiating and terminating sole wiper motor operation, a second rotatable member, said second member including means for engaging said first member to thereby rotate said first member in the same direction as said second member to initiate wiper motor operation when said second member is rotated, means operable in response to the rotation of said second member for initiating operation of said washer whereby actuation of said second member results in joint wiper-washer operation, and means for causing said second member to return to a deactuated position after release thereof while permitting said first rotatable member to remain in a wiper actuating position whereby said wiper remains in operation until said first rotatable member is rotated in a direction opposite to the direction in which said second member was rotated to initiate said joint wiper-washer operation.

7. A combined wiper-washer control comprising a first rotatable member for initiating and terminating sole wiper motor operation, a second rotatable member, said second member including means for engaging said first member to thereby cause said first member to initiate wiper motor operation in response to the actuation of said second member, means operable in response to the rotation of said second member for initiating operation of said washer whereby actuation of said second member results in joint wiper-washer operation, and means for permitting said first rotatable member to remain in a wiper actuating position after manipulation of said second member is terminated whereby said wiper remains in operation until said first rotatable member is manipulated.

8. A combined windshield wiper-washer control comprising a first rotatable member for initiating and terminating sole wiper motor operation, a second rotatable member, said second rotatable member including means for engaging said first member to thereby cause said first member to rotate in a direction in which said first member is normally rotated when it is manipulated for providing sole wiper motor operation to thereby initiate wiper motor operation in response to the rotation of said second member in the same direction which is normally utilized to initiate sole wiper motor operation, means operable in response to the rotation of said second member for initiating operation of said washer whereby actuation of said second member results in joint wiper-washer operation, and means for permitting said first rotatable member to remain in a wiper actuating position after release of said second rotatable member whereby said wiper remains in operation until said first rotatable member is rotated in a direction opposite to the direction in which said second rotatable member was rotated to initiate joint wiper washer operation.

9. In combination in an automotive vehicle, a wiper motor, a wiper blade, linkage means operatively coupling said motor to said blade, a washer pump, and a combined wiper-washer control comprising a first rotatable member for initiating and terminating sole wiper motor operation, a second rotatable member, said second rotatable member including means for causing said first rotatable member to initiate wiper motor operation when said second rotatable member is rotated, means operable in response to the rotation of said second member for initiating operation of said washer pump whereby actuation of said second member results in joint operation of said wiper motor and said washer pump, and means for causing said second rotatable member to return to a deactuated position after release thereof while permitting said first rotatable member to remain in a wiper motor actuating position whereby said wiper motor remains in operation until said first rotatable member is manipulated to terminate wiper motor operation.

10. A windshield cleaning system comprising a wiper unit having a wiper, a drive therefor, and a control for the drive; a washer unit having a pump, a drive therefor, and a control for the drive; and a coordinator unit connected to the control and operable selectively to give either wiper use solely or wiper use jointly with washer use, said coordinator unit comprising a primary actuating member operatively connected to the wiper unit control and manually rotated for sole wiper use, said primary member also having an axial movement for operating the control of the washer unit, and a secondary actuating member manually rotatable and operatively connected to impart both the axial and the rotary movements to the primary actuating member for such joint use.

References Cited in the file of this patent
UNITED STATES PATENTS
2,877,485    Oishei _____ Mar. 17, 1959